US009073254B2

(12) United States Patent
Zoppas et al.

(10) Patent No.: US 9,073,254 B2
(45) Date of Patent: Jul. 7, 2015

(54) CONVEYING AND COOLING APPARATUS FOR PREFORMS

(71) Applicant: S.I.P.A. Societa' Industrializzazione Progettazione E Automazione S.P.A., Vittorio Veneto (IT)

(72) Inventors: Matteo Zoppas, Conegliano (IT); Massimo Coran, Spresiano (IT)

(73) Assignee: S.I.P.A. Societa' Industrializzazione Progettazione E. Automazione S.P.A., Vittoria, Veneto (IT)

( * ) Notice: Subject to any disclaimer, the term of this patent is extended or adjusted under 35 U.S.C. 154(b) by 0 days.

(21) Appl. No.: 14/375,754

(22) PCT Filed: Jan. 30, 2013

(86) PCT No.: PCT/IB2013/050783
§ 371 (c)(1),
(2) Date: Jul. 30, 2014

(87) PCT Pub. No.: WO2013/114292
PCT Pub. Date: Aug. 8, 2013

(65) Prior Publication Data
US 2015/0044322 A1 Feb. 12, 2015

(30) Foreign Application Priority Data

Jan. 31, 2012 (IT) .............................. RM2012A0035

(51) Int. Cl.
*B29C 45/72* (2006.01)
(52) U.S. Cl.
CPC .............. *B29C 45/72* (2013.01); *B29C 45/7207* (2013.01); *B29C 2045/725* (2013.01)

(58) Field of Classification Search
CPC ............ B29C 45/72; B29C 2045/7214; B29C 2045/725
USPC ......... 425/526, 540, 548, 576, 437, 547, 572; 264/348, 538, 237
See application file for complete search history.

(56) References Cited

U.S. PATENT DOCUMENTS

| 3,690,802 A | 9/1972 | Fischer |
| 6,143,225 A | 11/2000 | Domodossola et al. |
| 6,299,431 B1 * | 10/2001 | Neter ............................ 425/526 |

FOREIGN PATENT DOCUMENTS

| WO | WO2005037521 A1 | 4/2005 |
| WO | WO2005084915 A1 | 9/2005 |

* cited by examiner

*Primary Examiner* — Joseph S Del Sole
*Assistant Examiner* — Thukhanh T Nguyen
(74) *Attorney, Agent, or Firm* — Stetina Brunda Garred & Brucker

(57) ABSTRACT

A conveying and cooling apparatus for performs comprising a cooling plate (12), that rotates about an axis X, and a system for supplying fluids and transmitting the rotational motion to the cooling plate, which comprises a single rotation shaft (14) provided with ducts (7, 8) for the passage of fluids from or to the cooling plate; a mechanical support structure (6) arranged along the X-axis, to support the cooling plate, and comprising the rotation shaft; a motor (10), arranged along the X-axis and adapted to transmit the rotation to the shaft and, consequently, to the cooling plate; and wherein fluid inlet/outlet pipes (3, 4) are connected to the shaft, said mechanical support structure being configured so as to act as rotating joint that allows the distribution of said fluids from said inlet/outlet pipes to the respective ducts or vice versa.

9 Claims, 4 Drawing Sheets

State of the art

CONVEYING AND COOLING APPARATUS FOR PREFORMS

CROSS REFERENCE TO RELATED APPLICATIONS

The present application claims priority to PCT International Application No. PCT/IB2013/050783 filed on Jan. 30, 2013, which application claims priority to Italian Patent Application No. RM2012A000035 filed Jan. 31, 2012, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to a conveying and cooling apparatus for preforms, made of a thermoplastic material, for the production of containers.

BACKGROUND OF THE INVENTION

The preforms are semi-finished products made of thermoplastic material for the production of containers that are in turn obtained by means of a subsequent blow-moulding or stretch-blow moulding process. The preforms are obtained by different processes, for example by means of injection-moulding or injection-compression or extrusion moulding together with further hot-forming operations. In the production of containers made of plastic material, such as bottles for example, the preforms are typically obtained by means of injection moulding with moulds provided with a plurality of moulding cavities.

Generally, the step that is the most time-consuming of the majority of injection moulding processes is the step for cooling the moulded items. Said cooling step takes place within the mould, and more specifically within the moulding cavities, until the moulded items are sufficiently stiff to be extracted from the mould and, subsequently, handled and conveyed. It is evident that, it will not be possible to release the cavity moulds and continue the production cycle with a new moulding step, until such a time as the moulded items are sufficiently cool, and have thus solidified. Therefore, to reduce the time of an entire moulding cycle, and thus increase moulding station productivity, there have been developed several devices capable of performing at least a part of the cooling of the preforms outside of the injection mould.

The systems for removing preforms from the injection moulds are nowadays provided with a cooling circuit. Said cooling system allows the production cycle time to be reduced as already described above; indeed if the removal system is provided with a cooling system, it is possible to reduce the time that the preforms must be kept within the injection mould. These removal systems generally comprise at least one preform cooling plate that is suitable for holding and cooling the preforms originating from the mould of the injection moulding machine for a predetermined time, and this by means of the circulation of suitable fluids within the same cooling plate.

This cooling plate, also known as "post-mould device" or "take-out device" or "end-of-arm tool" (EOAT), is provided with a plurality of cooling slots, also called cups, but known as "cooling pipes", "take-out pipes" or "cooling sleeves".

This cooling plate is, in a first known variant, a sliding plate or take-out plate, which by translating horizontally, is inserted between the two open die halves of the injection mould. A set N of preforms, where N indicates the number of moulding cavities of the mould, is allowed to fall into the cooling slots provided on said sliding plate The sliding plate, translating once again, is extracted from the mould and placed facing an extraction device, suitable for extracting the preforms from the plate itself and for depositing them on a system suitable for the conveying thereof for packaging or for the successive blow moulding or stretch-blow moulding steps for obtaining the end containers.

Alternatively, in a second known variant, this cooling plate is a plate that rotates about an own axis of rotation, arranged outside the mould, which is suitable for receiving the set N of preforms in its cooling slots from a further sliding plate which, by translating horizontally, is inserted between the two open die halves of the injection mould to remove the set N of preforms. The additional sliding plate, translating once again, is extracted from the mould and positioned facing the rotating cooling plate. The set N of preforms is inserted into the cooling slots provided on said rotating plate. At this point, the rotating plate rotates in such a way that the face comprising the cooling slots faces an underlying extraction and conveying device that carries the preforms for packaging or to the successive blow moulding or stretch-blow moulding steps for obtaining the end containers.

In other known and more developed variants, the cooling plate can rotate about an own axis or translate thus eliminating the need to envisage a further sliding plate that removes the preforms from the injection mould.

Whatever the method and injection mould extraction device, the cooling of the moulded preforms, which began in the moulding cavities of the mould, continues and is completed in the cooling slots of the cooling plate. The cooling slots, of a more or less tubular or in any case hollow form, are affixed onto a suitable support frame or yoke, aligned in two directions of space, and arranged in rows and columns so as to form a matrix. Within each cooling slot there is obtained a seat with a geometry that reproduces the shape of the outer surface of the preform. A preform to be cooled can be inserted into each seat through an insertion opening.

Cooling fluid, e.g. water and/or air, flows through the space inside the frame and the cooling slots, in order to cool the preform inserted into said slots. A plurality of channels inside both the cooling plate and the slots allows the cooling fluid to follow a suitable path so as to lap and cool the various tubular bodies of the cooling slots.

FIG. 1 illustrates a transmission joint for a conveying and cooling apparatus for preforms belonging to the internal state of the art of the company that owns the above-mentioned patent application. Said apparatus is partially housed in a traverse carriage 1, which allows translation of the entire apparatus comprising both the cooling plate (not illustrated in FIG. 1) and a system for supplying fluids and transmitting the rotation to said cooling plate.

This system for supplying fluids and transmitting the rotation comprises (FIG. 1):
  a rotating joint 2 for the distribution of fluids that performs water and air supply functions,
  a water inlet pipe 3 in said rotating joint,
  a water outlet pipe 4 from said rotating joint,
  an air inlet pipe 5 in said rotating joint,
  a mechanical support structure 6 of the rotating plate of cooling, arranged in line downstream of the rotating joint 2, a duct 7 for the inlet of water to the inner channels of the cooling plate, a duct 8 for recovering water from the inner channels of the cooling plate.

a duct 9 for supplying air to further inner channels of the cooling plate, a motor 10 that is staggered with respect to the longitudinal axis defined by the rotating joint 2 and by the mechanical support structure 6, transmission means 11 of the rotational motion, including pulleys and belt, to transmit the rotational motion from the motor 10 at one end of the mechanical support structure 6 connected to the cooling plate.

The ducts 7, 8, 9 cross both the mechanical support structure 6 and the rotating joint 2.

Both the structure of the rotating joint for the distribution of fluids and the mechanical support structure respectively comprise a shaft and the relevant bearings.

The conveying and cooling apparatus just described, presents a number of problems.

The large number of apparatus components entails for example, a significant weight that forces limitation of the speed and acceleration performance of the traverse carriage.

The large number of components and the arrangement thereof also entails considerable overall dimensions and a complex and expensive structure.

In addition, the belt transmission means for these specific applications entail a low reliability on account of the mechanical slack, which negatively affect the necessary accuracy of position, and on account of the numerous maintenance operations, such as belt replacement, the periodic centering of belt alignment, tension checks, etc. The foregoing is thus the cause of a low repeatability of an accurate positioning.

There is therefore a need to produce a conveying and cooling apparatus for the preforms that allows the aforementioned drawbacks to be overcome.

SUMMARY OF THE INVENTION

The main aim of the present invention is to produce a conveying and cooling apparatus for preforms that is simpler, lighter and less expensive with respect to known apparatuses.

Another aim of the invention is to produce a conveying and cooling apparatus for preforms that is at the same time much more reliable, accurate and capable of guaranteeing a high positioning repeatability.

The present invention therefore proposes to achieve the above-discussed aims, by producing a conveying and cooling apparatus for plastic preforms which, in accordance with claim 1, comprises:

a cooling plate adapted to rotate about a longitudinal axis X, a system for supplying fluids and transmitting the rotational motion to said cooling plate, wherein said system for supplying fluids and transmitting the rotational motion comprises a single rotation shaft provided with ducts for the passage of fluids from or to said cooling plate; a mechanical support structure arranged along the longitudinal axis X, to support the cooling plate arranged on a first side of said structure, and comprising said single rotation shaft; a motor, arranged along the longitudinal axis X on a second side of said mechanical support structure opposite the first side, and adapted to transmitting the rotation to said single rotation shaft and, consequently, to the cooling plate;

and wherein fluid inlet/outlet pipes are connected to said single rotation shaft;

said mechanical support structure being configured so as to act as a rotating joint that allows the distribution of said fluids from said inlet/outlet pipes to the respective ducts or vice versa.

The apparatus, object of the present invention, advantageously comprises a new rotating joint structure, which in addition to its intrinsic functions of supplying the fluids, for example, water and/or air, integrates mechanical support and cooling plate motor drive functions.

With respect to the apparatus for the prior art, the rotating joint is now integrated within the mechanical support structure itself.

The solution of the invention advantageously provides the use of the bearings and the shaft of the mechanical support structure of the cooling plate, not only as support and motion transmission members but also as members for the rotating joint for the distribution of the fluids. The fluid inlet/outlet pipes were therefore inserted directly into into the mechanical support structure of the cooling plate, also using the single shaft for the fluid distribution and transmission function. The single shaft and the respective bearings were therefore sized so as to be able to perform the mechanical support function of the cooling plate, the transmission function of the rotational motion from the distribution and recovery function of the fluids.

A further advantage of the apparatus for the invention is represented by the fact that upstream of the mechanical support structure, which now incorporates the rotating joint, the space occupied by the rotating joint in the state of the art as a separate element from the support structure is now occupied by the motor, which is therefore directly axial with the joint/support and integrally connected thereto, by means of a reducer for example, or directly but in any case by means of suitable connecting means.

This new configuration has therefore permitted elimination of the belt transmission means and pulleys.

Advantageously the apparatus for the invention allows the following:

a reduction of costs thanks to the reduction in the number of components;

a reduction of the weight with a consequent increase in the speed and acceleration performance of the traverse carriage;

a reduction of the overall dimensions;

a reduction of the mechanical slack with consequent improved positioning accuracy and repeatability;

a reduction of the maintenance operations.

The dependent claims describe preferred embodiments of the invention.

BRIEF DESCRIPTION OF THE DRAWINGS

Further characteristics and advantages of the invention will become clearer in the light of the detailed description of preferred but non-exclusive embodiments of a conveying and cooling apparatus for preforms, illustrated by way of a non-limiting example, with the assistance of the accompanying drawings, wherein.

The same reference numbers in the drawings identify the same elements or components.

DETAILED DESCRIPTION OF PREFERRED EMBODIMENTS OF THE INVENTION

Figure 1:
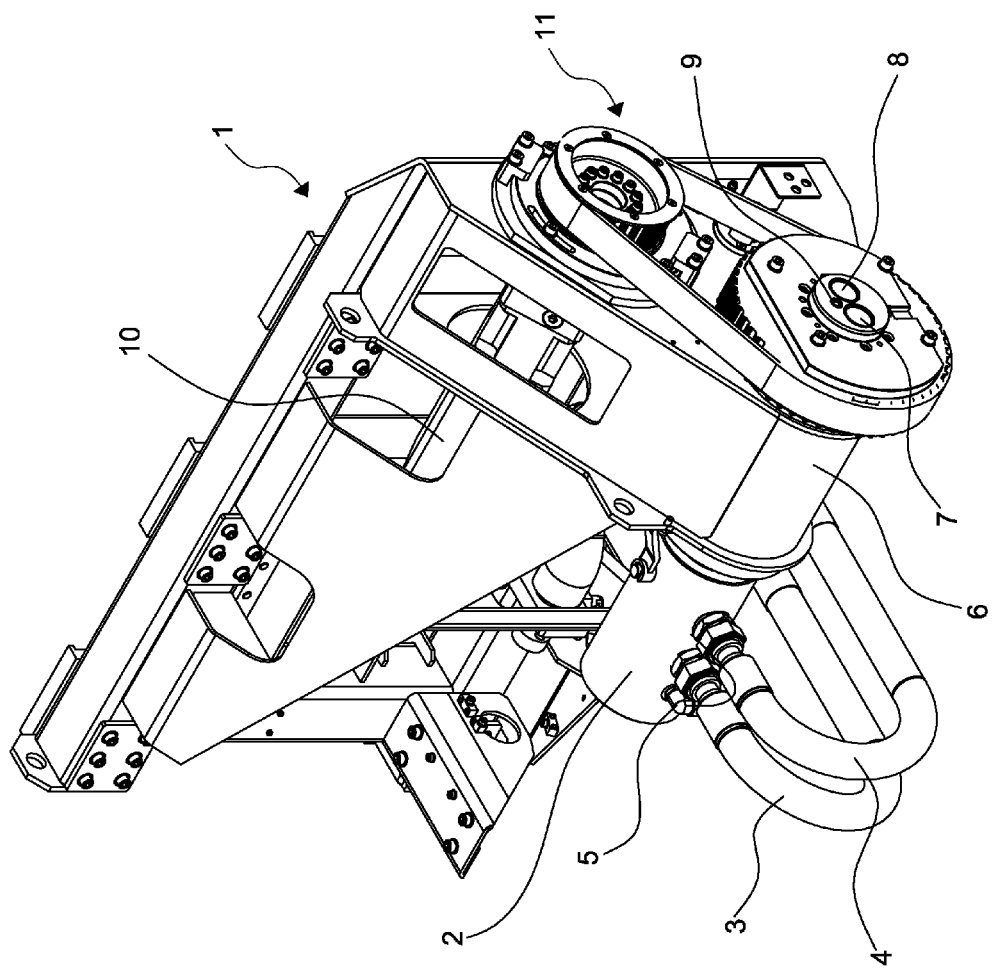
FIG. 1 shows a perspective view of one part of an apparatus for the prior art.
Figure 2:
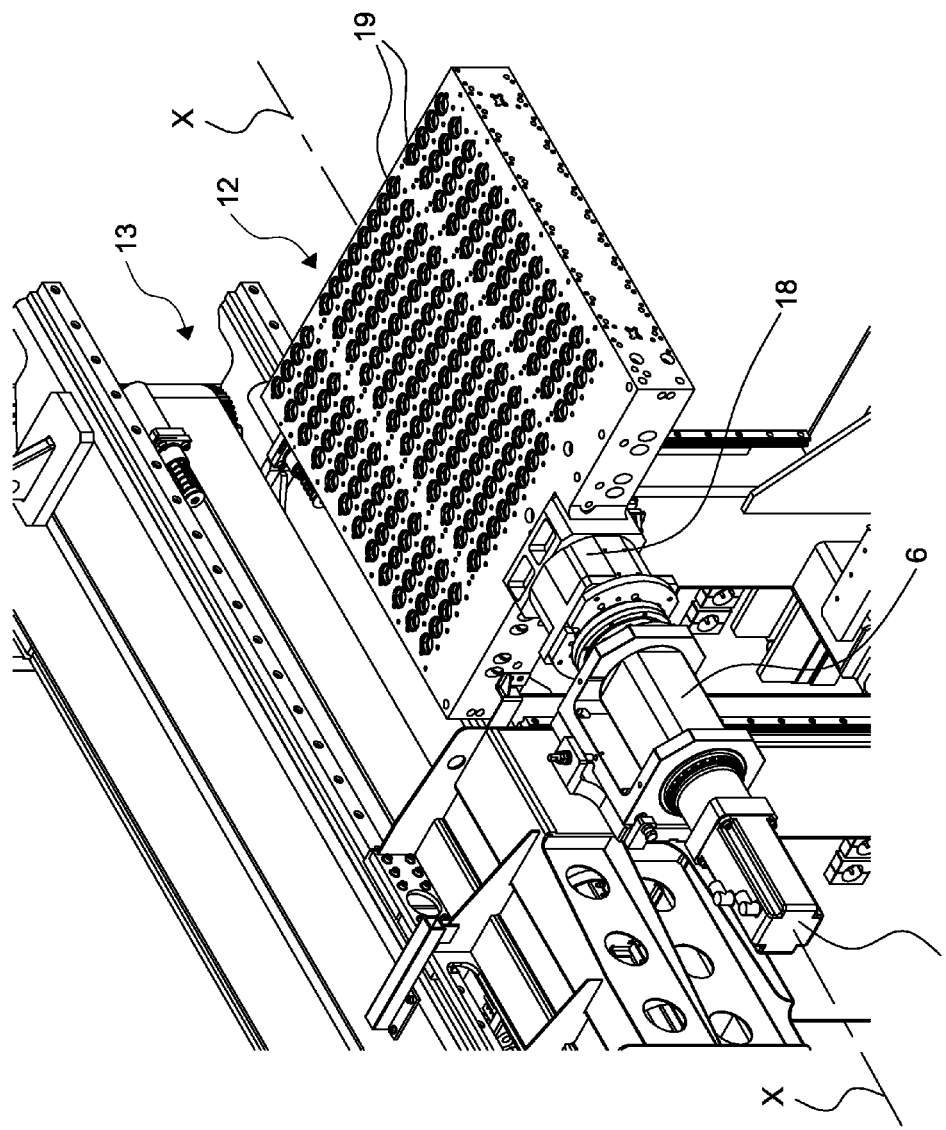
FIG. 2 shows a perspective view of one embodiment of the apparatus according to the invention.
Figure 3:
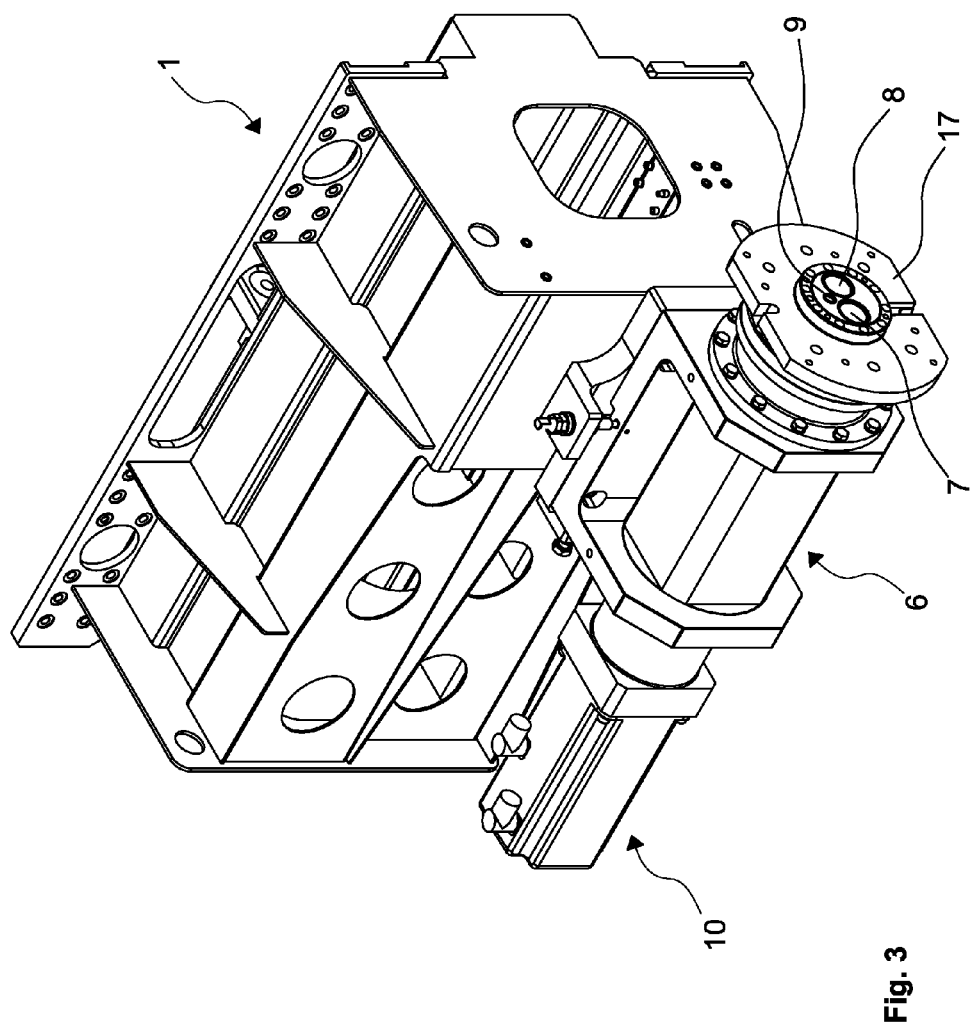
FIG. 3 shows a perspective view of one part of the apparatus of FIG. 2.
Figure 4:
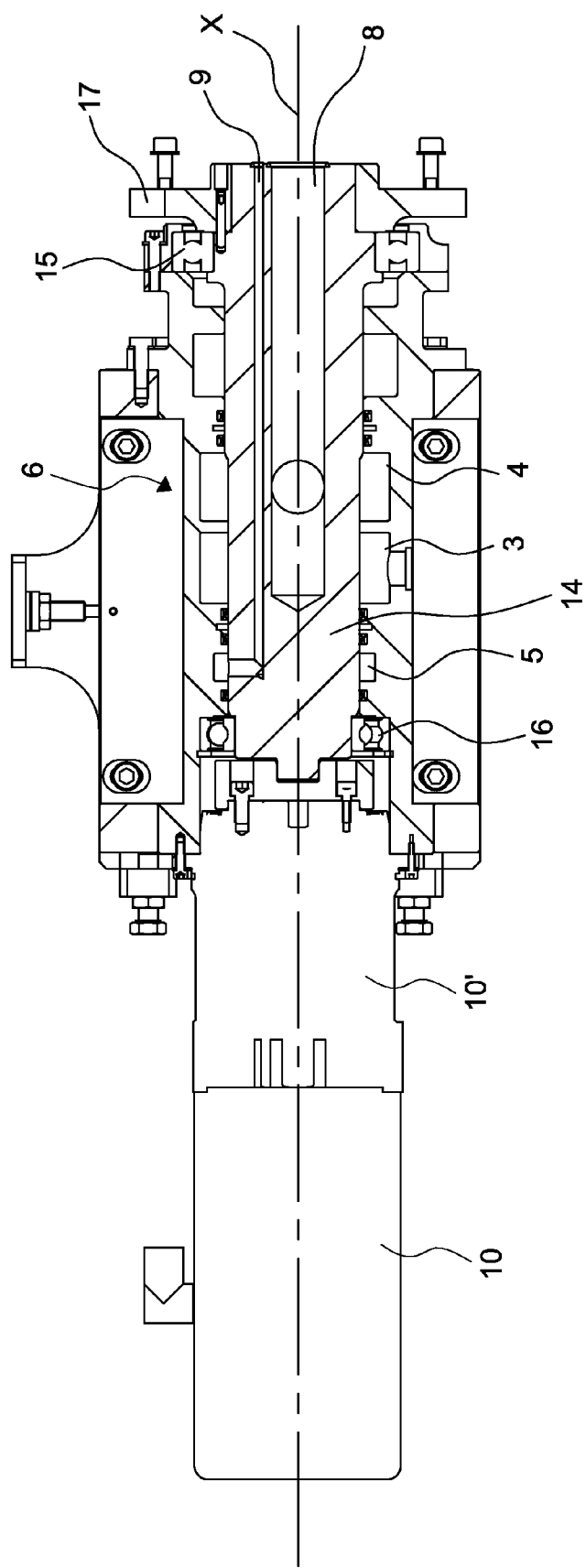
FIG. 4 shows a partial cross-sectional view of one part of the apparatus of FIG. 3.

With reference to FIGS. 2 to 4 there is represented a conveying and cooling apparatus for preforms for the production of containers, in particular, bottles, made of a thermoplastic material such as PET, PEN, PP, PLA or other further and suitable material, as well as mixtures thereof, by means of subsequent blow moulding or stretch-blow moulding or preheated preforms.

This conveying and cooling apparatus for preforms includes a cooling plate 12, adapted to rotate about an own axis, that is connected to a system for supplying fluids and transmitting the rotational motion.

The plate 12 is provided on at least one of the two main faces with a plurality of slots or cooling cups 19. Said cooling slots, of a more or less tubular or in any case hollow shape, are affixed onto a suitable support frame or yoke, are aligned in two directions of space, and arranged in rows and columns so as to form a matrix. Within each cooling slot there is obtained a seat within which a preform to be cooled can be inserted through an insertion opening. A cooling fluid, for example, water and/or air passes through the space inside the support frame or yoke so as to cool the preforms inserted into said slots. A plurality of channels, inside both the cooling plate and the slots, allows the cooling fluid to follow a suitable path so as to lap and cool the various tubular bodies of the cooling slots.

The system for supplying fluids and transmitting the rotational motion is affixed to a traverse carriage 1 sliding along mechanical guides that are integral to a fixed structure 13.

The traverse carriage 1 allows translation of the entire apparatus back and forth along a predetermined direction.

Advantageously, this system for supplying fluids and transmitting the rotation comprises:
- a single rotation shaft 14 mounted on bearings 15, 16 and internally provided with ducts for the passage of cooling fluids from or to said cooling plate 12;
- a mechanical support structure 6 of the rotating cooling plate 12 defining a longitudinal axis X, comprising said single rotation shaft 14 and configured so as to act, as well as a rotating support, as rotating joint for the distribution of fluids;
- and a motor 10, arranged upstream of said support structure 6 along the same longitudinal axis X that is adapted to transmit, for example, by means of a reducer 10' or directly, but in any case, by means of suitable connecting means (a joint for example), the rotation to said single rotation shaft 14 and, therefore, to the cooling plate 12.

The rotation shaft 14, or rotating support shaft, is connected at first ends thereof to the motor 10 by means, for example, of a reducer 10' or directly by means of suitable connecting means, and is connected at a second end thereof to a coupling flange 17 for affixing to the cooling plate 12.

In one embodiment of the invention, a water inlet pipe 3, an outlet water pipe 4 and an air inlet pipe 5 are directly connected in the mechanical support structure 6, also using the single shaft 14 for the function of rotating joint for the fluid distribution and transmission function. The single shaft 14 and the respective bearings 15, 16 are sized so as to also act as fluid distribution function in addition to motion support and transmission function. Within the rotation shaft 14 there are provided a duct 7 for the inlet of water to the inner channels of the cooling plate, a duct 8 for recovering water from the inner channels of the cooling plate and a duct 9 for supplying air to further inner channels of the cooling plate.

All these ducts 7, 8, 9 are in communication, at first ends thereof, by means of the rotating joint at the respective inlet and outlet pipes and are in communication at a second end thereof, at one end of the shaft itself, either directly or indirectly, with the respective inner channels of the cooling plate 12. There can be provided a spacer 18 that is firmly affixed on a part to the flange 17 and on a second part to the cooling plate 12, which internally contains connection channels between the ducts 7, 8, 9 and the respective inner channels of the plate 12. The spacer 18 may be provided to reduce the weight to be moved, thus avoiding the use of a longer cooling plate 12.

More in general, within the single shaft 14 there are provided at least one duct 7 for the inlet of a first cooling fluid, water for example, into the inner channels of the cooling plate 12 and at least one duct 8 for recovering the first cooling fluid from the inner channels of the cooling plate 12. Said duct 7 and said second duct 8 are in communication, at first ends thereof, by means of the rotating joint at the respective inlet and outlet pipes 3, 4 and are in communication at a second end thereof, at one end of the shaft 14 itself, either directly or indirectly, with the respective inner channels of the cooling plate 12.

Within the single shaft 14 there can also be provided at least one duct for the inlet of a second fluid, air for example, to the inner channels of the plate 12 and at least one duct for recovering the second fluid from the inner channels of the plate 12. Said inlet and outlet pipes are again in this case in communication, at a second end thereof, by means of the rotating joint at the respective inlet or outlet pipes and are in communication, at a second end thereof at one end of the shaft 14 itself, either directly or indirectly, with the respective inner channels of the cooling plate 12.

With respect to the apparatus of the prior art, then, the rotating joint for the distribution of fluids is now integrated within the mechanical support structure 6 itself, thus eliminating a further shaft and the respective bearings, as well as all the motion transmission members as previously described (belt transmission means).

In addition to the rotating joint for the distribution of fluids, in one variant of the apparatus of the invention (not illustrated), there can also be provided an electric rotating joint to also allow the transmission of electric current from the motor 10 area to the cooling plate 12 for any additional applications such as, for example, the transmission of signals from thermocouples, photocells or sensors, as well as the control of electrovalves and actuators in general.

In this case the support shaft 14 is also provided with electric conductors that cross the entire shaft 14 and reach predetermined points of the cooling plate 12 on one side, and is provided with a corresponding series of sliding contacts, on the other side.

The invention claimed is:
1. A conveying and cooling apparatus for plastic performs comprising
   a cooling plate, adapted to rotate about a longitudinal axis (X),
   a system for supplying fluids and transmitting the rotational motion to said cooling plate, wherein said system for supplying fluids and transmitting the rotational motion comprises
   a single rotation shaft provided with ducts for the passage of fluids from or to said cooling plate,
   a mechanical support structure arranged along the longitudinal axis (X), for supporting the cooling plate arranged at a first side of said structure, and comprising said single rotation shaft, a motor, arranged along the longitudinal axis (X) at a second side of said mechanical support structure opposite the first side, and adapted to transmit the rotation to said single rotation shaft and, consequently, to the cooling plate, and wherein fluid inlet/outlet pipes are connected to said single rotation shaft, said mechanical support structure being configured to act as a rotating joint that allows the distribution of said fluids from said inlet/outlet pipes to the respective ducts or vice versa.

2. An apparatus according to claim 1, wherein said single rotation shaft is mounted on bearings and is connected, at first ends thereof, to the motor and, at a second end thereof, to the cooling plate.

3. The apparatus according to claim 2, wherein at least a first duct for introducing a first cooling fluid into the inner channels of the cooling plate, and at least a second duct for recovering the first cooling fluid from the inner channels of the cooling plate are provided within the single shaft.

4. The apparatus according to claim 3, wherein said first duct and said second duct are in communication, at first ends thereof, by means of the rotating joint with the respective inlet and outlet pipes and are in communication, at a second end thereof, with one end of the shaft itself, either directly or indirectly with the respective inner channels of the cooling plate.

5. The apparatus according to claim 3, wherein within the single shaft there is provided at least a third duct for supplying a second fluid to further inner channels of the cooling plate.

6. The apparatus according to claim 5, wherein the third duct is in communication, at a first end thereof, by means of the rotating joint with the respective inlet pipe and is in communication, at a second end thereof, at one end of the shaft itself, either directly or indirectly, with a respective inner channel of the cooling plate.

7. The apparatus according to claim 1, wherein an electric rotating joint is provided to further allow the transmission of electric current from the motor to the cooling plate.

8. An The apparatus according to claim 7, wherein said single shaft is provided with electric conductors that cross it and reach as far as predetermined points of the cooling plate, on one side, and is provided with a corresponding series of sliding contacts, on the other side.

9. The apparatus according to claim 1, wherein said system for supplying fluids and transmitting the rotational motion is affixed to a translation carriage that slides along mechanical guides that are integral to a fixed structure.

\* \* \* \* \*